US012579656B2

(12) United States Patent
Cramer et al.

(10) Patent No.: US 12,579,656 B2
(45) Date of Patent: Mar. 17, 2026

(54) MACHINE LEARNING DENTAL SEGMENTATION SYSTEM AND METHODS USING GRAPH-BASED APPROACHES

(71) Applicant: Align Technology, Inc., San Jose, CA (US)

(72) Inventors: Christopher E. Cramer, Durham, NC (US); Pavel Agniashvili, Moscow (RU); Chad Clayton Brown, Cary, NC (US)

(73) Assignee: Align Technology, Inc., San Jose, CA (US)

( * ) Notice: Subject to any disclaimer, the term of this patent is extended or adjusted under 35 U.S.C. 154(b) by 1069 days.

(21) Appl. No.: 17/671,406

(22) Filed: Feb. 14, 2022

(65) Prior Publication Data

US 2022/0262007 A1 Aug. 18, 2022

Related U.S. Application Data

(60) Provisional application No. 63/149,194, filed on Feb. 12, 2021.

(51) Int. Cl.
| | |
|---|---|
| *G06T 7/11* | (2017.01) |
| *A61C 13/34* | (2006.01) |
| *G06N 3/08* | (2023.01) |
| *G06T 7/162* | (2017.01) |
| *G06T 17/20* | (2006.01) |
| *G06V 10/774* | (2022.01) |
| *G06V 10/82* | (2022.01) |

(52) U.S. Cl.
CPC .............. *G06T 7/162* (2017.01); *A61C 13/34* (2013.01); *G06N 3/08* (2013.01); *G06T 7/11* (2017.01); *G06T 17/205* (2013.01); *G06V 10/774* (2022.01); *G06V 10/82* (2022.01); *G06T 2207/20081* (2013.01); *G06T 2207/20084* (2013.01); *G06T 2207/30036* (2013.01); *G06V 2201/03* (2022.01)

(58) Field of Classification Search
CPC ......... G06T 7/162; G06T 7/11; G06T 17/205; G06T 2207/20081; G06T 2207/20084; G06T 2207/30036; G06T 2207/10028; G06T 2210/41; G06T 17/20; A61C 13/34; A61C 7/002; G06N 3/08; G06N 3/0464; G06N 3/09; G06V 10/774; G06V 10/82; G06V 2201/03; G06V 10/26; G06V 10/7635; G06V 10/84; G06V 10/454; G06V 20/64
See application file for complete search history.

(56) References Cited

U.S. PATENT DOCUMENTS

| | | |
|---|---|---|
| 5,975,893 A | 11/1999 | Chishti et al. |
| 6,227,850 B1 | 5/2001 | Chishti et al. |

(Continued)

*Primary Examiner* — Sanchita Roy
(74) *Attorney, Agent, or Firm* — Shay Glenn LLP

(57) ABSTRACT

Provided herein are systems and methods for automatically segmenting a 3D model of a patient's teeth. A patient's dentition may be scanned. The scan data may be converted into a 3D model, including a graph-based representation of the 3D model. The graph-based representation can be input into a machine learning model to train the machine learning model to segment the 3D model into individual dental components. Trained machine learning models can also be used to segment graph-based representations of a 3D model of a patient's teeth.

23 Claims, 11 Drawing Sheets

(56) References Cited

U.S. PATENT DOCUMENTS

| | | |
|---|---|---|
| 6,227,851 B1 | 5/2001 | Chishti et al. |
| 6,299,440 B1 | 10/2001 | Phan et al. |
| 6,318,994 B1 | 11/2001 | Chishti et al. |
| 6,371,761 B1 | 4/2002 | Cheang et al. |
| 6,386,878 B1 | 5/2002 | Pavlovskaia et al. |
| 6,406,292 B1 | 6/2002 | Chishti et al. |
| 6,409,504 B1 | 6/2002 | Jones et al. |
| 6,457,972 B1 | 10/2002 | Chishti et al. |
| 6,488,499 B1 | 12/2002 | Miller |
| 6,514,074 B1 | 2/2003 | Chishti et al. |
| 6,554,611 B2 | 4/2003 | Chishti et al. |
| 6,582,229 B1 | 6/2003 | Miller et al. |
| 6,602,070 B2 | 8/2003 | Miller et al. |
| 6,621,491 B1 | 9/2003 | Baumrind et al. |
| 6,688,886 B2 | 2/2004 | Hughes et al. |
| 6,726,478 B1 | 4/2004 | Isiderio et al. |
| 6,729,876 B2 | 5/2004 | Chishti et al. |
| 6,739,869 B1 | 5/2004 | Taub et al. |
| 6,767,208 B2 | 7/2004 | Kaza |
| 6,783,360 B2 | 8/2004 | Chishti |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,108,508 B2 | 9/2006 | Hedge et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,241,142 B2 | 7/2007 | Abolfathi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,689,398 B2 | 3/2010 | Cheng et al. |
| 7,736,147 B2 | 6/2010 | Kaza et al. |
| 7,746,339 B2 | 6/2010 | Matov et al. |
| 7,844,356 B2 | 11/2010 | Matov et al. |
| 7,844,429 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,930,189 B2 | 4/2011 | Kuo |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,591,225 B2 | 11/2013 | Wu et al. |
| 8,788,285 B2 | 7/2014 | Kuo |
| 8,843,381 B2 | 9/2014 | Kuo et al. |
| 8,874,452 B2 | 10/2014 | Kuo |
| 8,896,592 B2 | 11/2014 | Boltunov et al. |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,375,300 B2 | 6/2016 | Matov et al. |
| 9,414,897 B2 | 8/2016 | Wu et al. |
| 9,492,245 B2 | 11/2016 | Sherwood et al. |
| 9,642,678 B2 | 5/2017 | Kuo |
| 10,248,883 B2 | 4/2019 | Borovinskih et al. |
| 10,342,638 B2 | 7/2019 | Kitching et al. |
| 10,463,452 B2 | 11/2019 | Matov et al. |
| 10,595,966 B2 | 3/2020 | Carrier, Jr. et al. |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,033,359 B2 | 6/2021 | Velazquez et al. |
| 11,071,608 B2 | 7/2021 | Derakhshan et al. |
| 11,096,763 B2 | 8/2021 | Akopov et al. |
| 11,116,605 B2 | 9/2021 | Nyukhtikov et al. |
| 11,147,652 B2 | 10/2021 | Mason et al. |
| 11,151,753 B2 | 10/2021 | Gao et al. |
| 11,154,381 B2 | 10/2021 | Roschin et al. |
| 11,259,896 B2 | 3/2022 | Matov et al. |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0197728 A1 | 10/2004 | Abolfathi et al. |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2008/0306724 A1 | 12/2008 | Kitching et al. |
| 2010/0009308 A1 | 1/2010 | Wen et al. |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0167243 A1 | 7/2010 | Spiridonov et al. |
| 2013/0204599 A1 | 8/2013 | Matov et al. |
| 2015/0039613 A1* | 2/2015 | Li .......................... G06F 16/35 |
| | | 707/737 |
| 2016/0310235 A1 | 10/2016 | Derakhshan et al. |
| 2017/0083770 A1* | 3/2017 | Carlson ................ G06V 20/698 |
| 2017/0169562 A1* | 6/2017 | Somasundaram ..... G06V 10/26 |
| 2017/0273760 A1 | 9/2017 | John et al. |
| 2018/0280118 A1 | 10/2018 | Cramer |
| 2019/0008446 A1* | 1/2019 | Cunliffe ............... A61B 5/1078 |
| 2019/0029784 A1 | 1/2019 | Moalem et al. |
| 2019/0053876 A1 | 2/2019 | Sterental et al. |
| 2019/0192259 A1 | 6/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2020/0000552 A1 | 1/2020 | Mednikov et al. |
| 2020/0000554 A1 | 1/2020 | Makarenkova et al. |
| 2020/0000555 A1 | 1/2020 | Yuryev et al. |
| 2020/0085546 A1 | 3/2020 | Li et al. |
| 2020/0107915 A1 | 4/2020 | Roschin et al. |
| 2020/0155274 A1 | 5/2020 | Pimenov et al. |
| 2020/0214800 A1 | 7/2020 | Matov et al. |
| 2020/0297458 A1 | 9/2020 | Roschin et al. |
| 2020/0306011 A1 | 10/2020 | Chekhonin et al. |
| 2020/0306012 A1 | 10/2020 | Roschin et al. |
| 2020/0315744 A1 | 10/2020 | Cramer |
| 2020/0360109 A1 | 11/2020 | Gao et al. |
| 2021/0073998 A1 | 3/2021 | Brown et al. |
| 2021/0134436 A1 | 5/2021 | Meyer et al. |
| 2021/0174477 A1 | 6/2021 | Shi et al. |
| 2021/0322136 A1* | 10/2021 | Anssari Moin ........ G16H 50/70 |

(56)                     References Cited

U.S. PATENT DOCUMENTS

| 2022/0067943 A1* | 3/2022 | Claessen | ............. | G06N 3/0464 |
| 2022/0215531 A1* | 7/2022 | Azernikov | ........... | G06T 7/0012 |
| 2022/0262007 A1* | 8/2022 | Cramer | ............... | G06V 10/774 |

\* cited by examiner

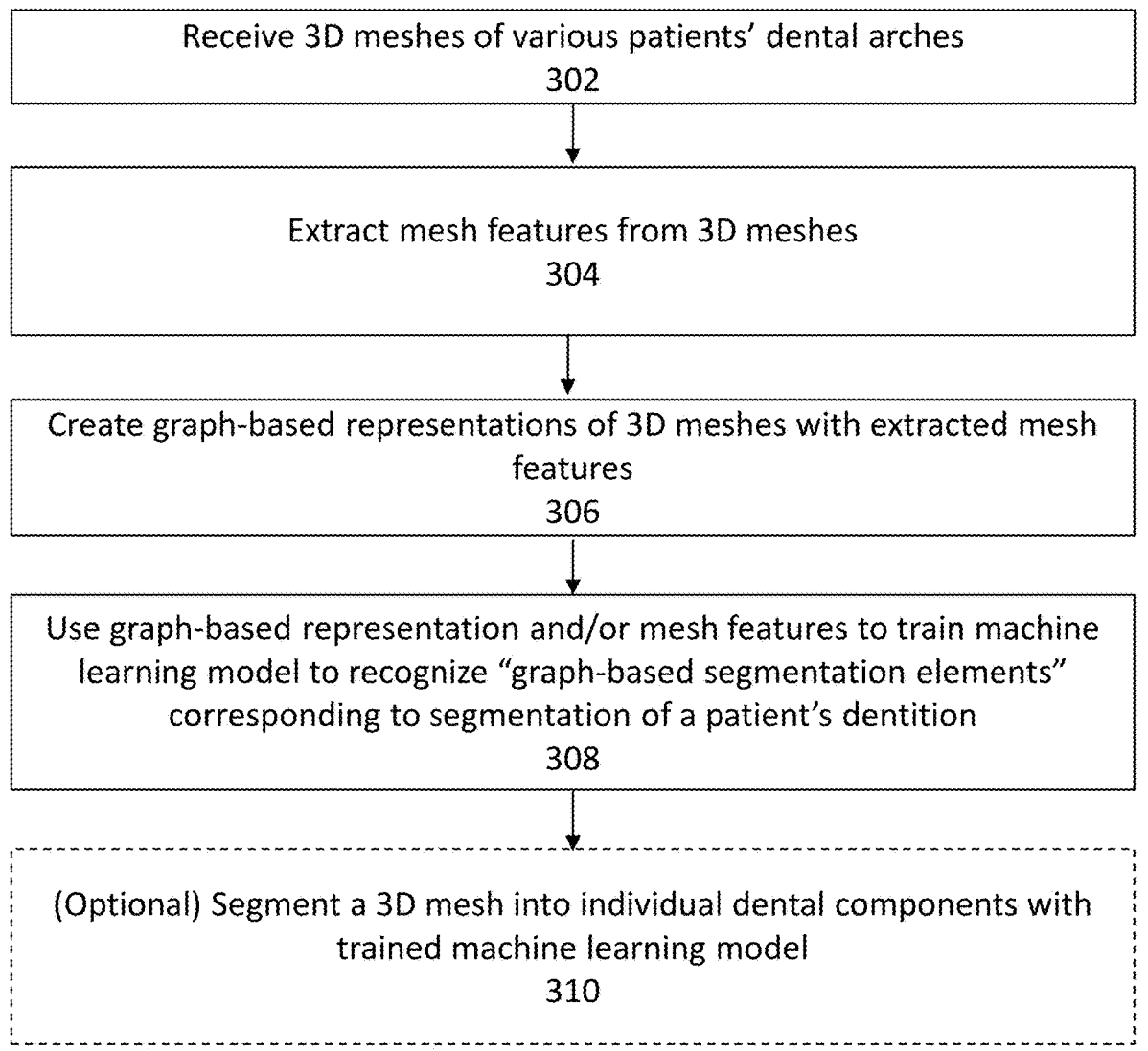

Receive 3D meshes of various patients' dental arches
302

Extract mesh features from 3D meshes
304

Create graph-based representations of 3D meshes with extracted mesh features
306

Use graph-based representation and/or mesh features to train machine learning model to recognize "graph-based segmentation elements" corresponding to segmentation of a patient's dentition
308

(Optional) Segment a 3D mesh into individual dental components with trained machine learning model
310

FIG. 3

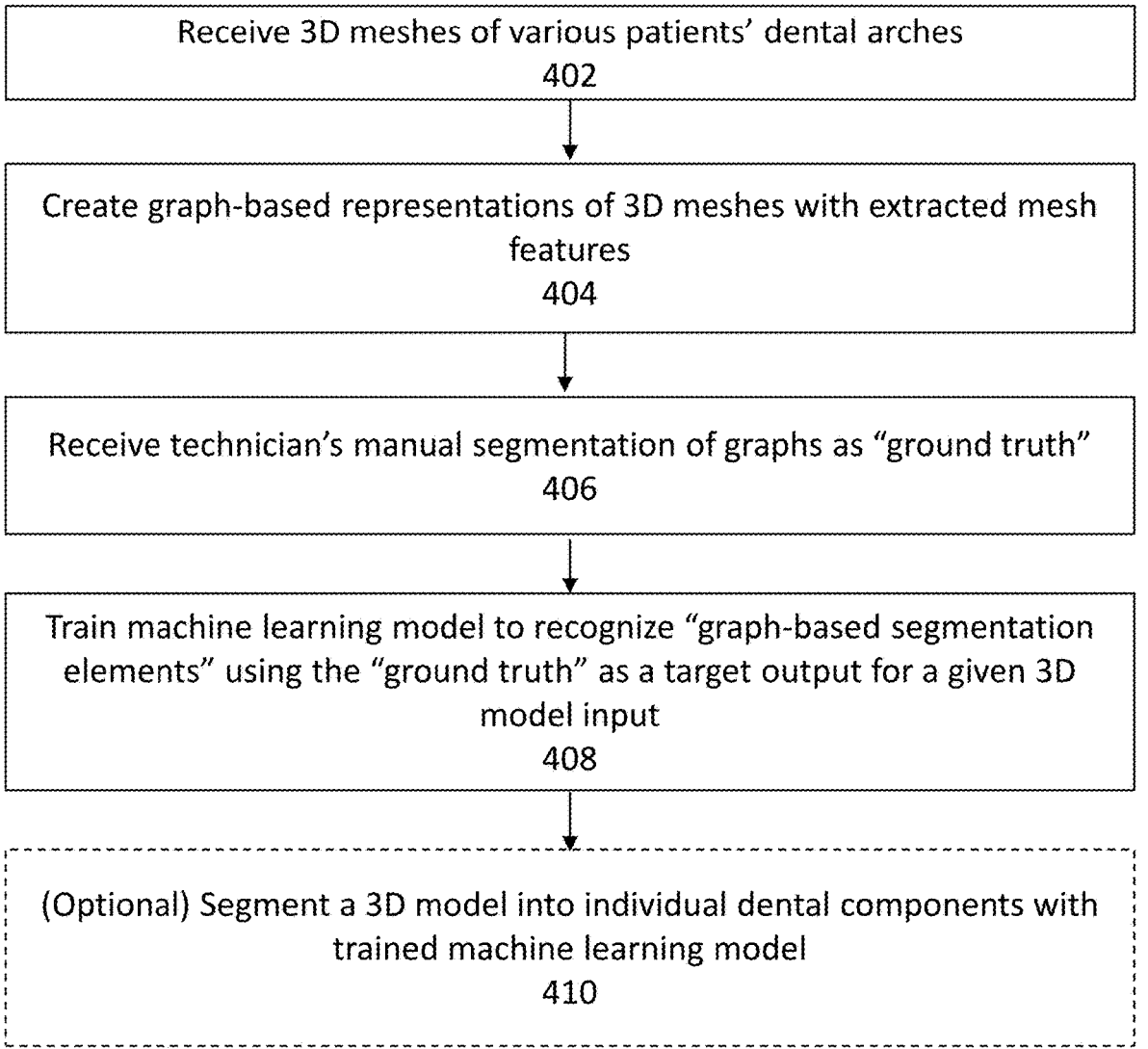

Receive 3D meshes of various patients' dental arches
402

Create graph-based representations of 3D meshes with extracted mesh features
404

Receive technician's manual segmentation of graphs as "ground truth"
406

Train machine learning model to recognize "graph-based segmentation elements" using the "ground truth" as a target output for a given 3D model input
408

(Optional) Segment a 3D model into individual dental components with trained machine learning model
410

FIG. 4

Capture 3D scan of patient's dentition
502

(Optional) Convert 3D scan into 3D dental model
504

Segment 3D scan or 3D dental model into individual dental components
with trained machine learning model
506

MACHINE LEARNING DENTAL SEGMENTATION SYSTEM AND METHODS USING GRAPH-BASED APPROACHES

CLAIM OF PRIORITY

This patent application claims priority to U.S. Provisional Patent Application No. 63/149,194, titled "MACHINE LEARNING DENTAL SEGMENTATION SYSTEM AND METHODS USING GRAPH-BASED APPROACHES," filed on Feb. 12, 2021, herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

Orthodontic procedures typically involve repositioning a patient's teeth to a desired arrangement in order to correct malocclusions and/or improve aesthetics. To achieve these objectives, orthodontic appliances such as braces, shell aligners, and the like can be applied to the patient's teeth by an orthodontic practitioner and/or by the patients themselves. The appliance can be configured to exert force on one or more teeth in order to effect desired tooth movements according to a treatment plan.

Orthodontic aligners may include devices that are removable and/or replaceable over the teeth. Orthodontic aligners may be provided as part of an orthodontic treatment plan. In some orthodontic treatment plans involving removable and/or replaceable aligners, a patient may be provided plurality of orthodontic aligners over the course of treatment to make incremental position adjustments to the patient's teeth. An orthodontic aligner may have a polymeric trough with an inner cavity shaped to receive and resiliently reposition teeth from one tooth arrangement to a successive tooth arrangement. Orthodontic aligners may include "active" regions that impose repositioning forces on teeth and "passive" regions that retain teeth in their current state.

Many digital scan technologies use automated tooth segmentation systems (e.g., automated systems that identify and/or number individual teeth and/or dental features in a dental model). Unfortunately, individual teeth and additional dental features such as the gingiva or interproximal spaces between teeth be misidentified or missed entirely by automated tooth segmentation systems and/or conventional digital scanning technologies. Additionally, many of these automated tooth segmentation systems still require significant input from a technician to correctly segment the teeth.

To date, there has been a great deal of work performed on 2D semantic segmentation (i.e., the segmentation of images into specific, labeled components). There has been significantly less work in 3D due to the enormous memory requirements (e.g., a medium-resolution image might contain 512×512 pixels, so to achieve the same resolution in voxels a system may require more than 256 times that amount of memory. It would be particularly helpful to provide one or more tools that may aid in analyzing and or guiding treatments that may automatically and accurately segment teeth, particularly directly on 3D meshes.

SUMMARY OF THE DISCLOSURE

Implementations address the need to provide an automated tooth segmentation system to automatically, effectively, and accurately segment individual teeth and dental features from a scan or 3D mesh of a patient's detention, with a high degree of accuracy. Described herein are methods and apparatuses that address these and other technical problems by providing technical solutions and/or automated agents that automatically segment teeth and dental features using machine learning neural networks. In some implementations, segmentation is performed with a set of 3D convolutional neural networks that uses graph-based representation of the 3D mesh.

Automatic tooth segmentation may provide the basis for implementation of automated orthodontic treatment plans, design and/or manufacture of orthodontic aligners (including series of polymeric orthodontic aligners that provide forces to correct malocclusions in patients' teeth). These apparatuses and/or methods may provide or modify a treatment plan, including an orthodontic treatment plan. The apparatuses and/or methods described herein may provide instructions to generate and/or may generate a set or series of aligners, and/or orthodontic treatment plans using orthodontic aligners that incorporate post-treatment tooth position scoring. The apparatuses and/or methods described herein may provide a visual representation of the patient's teeth including the post-treatment tooth position scoring.

In general, example apparatuses (e.g., devices, systems, etc.) and/or methods described herein may acquire a representation of a patient's teeth. The representation may be a 3D model of the patient's teeth (e.g., a 3D tooth point cloud or a 3D mesh). In some implementations, a subset of the 3D model (e.g., a specific number of points representing each tooth) can be used as the input.

Furthermore, example apparatuses (e.g., devices, systems, etc.) and/or methods described herein may convert the 3D models into graph-based representations that preserve the structure of connections from the 3D mesh. Example apparatuses can further implement automated agents to compute features of the graph-based representations, including mesh faces of the 3D mesh and face adjacency matrices associated with each mesh face of the mesh. These computed features can be used to create the graph representation.

In general, example apparatuses (e.g., devices, systems, etc.) and/or methods described herein may use the computed features in the graph-based representations to train a machine learning model to recognize "graph-based segmentation elements" corresponding to segmentation of patient's dentition. Examples of machine learning systems that may be used include, but are not limited to, Convolutional Neural Networks (CNN) such as U-Net, ResNeXt, Xception, RefineNet, Kd-Net, SO Net, Point Net, or Point CNN, and additional machine learning systems such as Decision Tree, Random Forest, Logistic Regression, Support Vector Machine, AdaBoosT, K-Nearest Neighbor (KNN), Quadratic Discriminant Analysis, Neural Network, etc.

In particular, the methods and apparatuses described herein may use graph-based convolution techniques.

Once the machine learning systems have been trained, they can be used to generate a segmented model of the patient's detention. The machine learning models can be configured to apply ground truth labeling when generating an output data set or a segmentation result.

Any of the apparatuses and/or methods described herein may be part of a distal tooth scanning apparatus or method or may be configured to work with a digital scanning apparatus or method.

The apparatuses (including devices and system, including software, firmware and/or hardware) described herein may be used for segment a three-dimensional mesh model of a patient's dentition (e.g., teeth, gingiva, arch, etc.) using a graph-based representation of the 3D mesh. A graph-based representation of a 3D mesh model of a dentition may use vertices and edges of the 3D mesh model and may determine relationships between them that may be used to segment the 3D mesh. Segmentation boundaries may be determined by training a machine learning agent that determines the boundary based on where similarity ends, and dissimilarity begins. Segmentation using graph-based representations of a 3D mesh model of the teeth may result in a relatively high level of detail.

For example, described herein are methods of training a machine learning model to segment a 3D dental model, the method comprising the steps of: receiving, in a computing device, a three-dimensional (3D) mesh of a patient's dentition; extracting mesh features from the 3D mesh; creating a graph-based representation of the 3D mesh with the extracted mesh features; and applying the mesh features and/or the graph-based representation to train a machine learning model of the computing device to recognize graph-based segmentation elements corresponding to segmentation of the patient's dentition. These methods may be part of a method for segmenting the 3D dental model, and/or methods of treatment planning since the segmented 3D models may be used for treatment planning, including in particular treatment planning for an orthodontic treatment using a series of aligners.

In general, the mesh features of the 3D mesh may include mesh faces of the 3D mesh. The mesh features may further include face adjacency matrices associated with each mesh face of the 3D mesh. For example, creating the graph-based representation may comprise using the mesh faces as nodes of the graph-based representation and using the face adjacency matrices as edges of the graph. This may include storing the graph-based representation in a memory of the computing device.

In an of these examples the mesh features can be one or more of a face center position, a face normal vector, a local curvature, and a face area.

The methods described herein may include segmenting the graph-based representation into individual dental components with the machine learning model.

The 3D mesh may comprise a scan of the patient's dentition.

Any of these methods may include repeating the receiving, extracting, creating, and applying steps for a plurality of 3D meshes of patients' dentitions.

The machine learning model may be trained to construct a semantic segmentation network in which multiple objects of the same class are treated as a single entity. In some examples the machine learning model is trained to construct an instance segmentation network in which multiple objects of the same class are treated as distinct individual objects or instances.

Also described herein are methods of training a machine learning model to segment a 3D dental model, including the steps of: receiving, in a computing device, a three-dimensional (3D) mesh of a patient's dentition; creating, in the computing device, a graph-based representation of the 3D mesh that represents the patient's dentition; receiving, in the computing device, a ground truth input comprising a manual segmentation of the 3D mesh; and training a machine learning model of the computing device produce a segmentation output that attempts to achieve the ground truth input. In some examples, the method includes segmenting the graph-based representation into individual dental components with the trained machine learning model. The method may include identifying interproximal spaces between teeth with the trained machine learning model.

The method may include identifying individual teeth with the trained machine learning model.

As mentioned, the method may include repeating the receiving, creating, receiving, and training steps for a plurality of 3D meshes of patients' dentitions. Training the machine learning model may include adjusting weights of the machine learning model to minimize an error between the ground truth input and the segmentation output.

Also described herein are methods of segmenting a 3D dental model, the method comprising the steps of: receiving, in a computing device, a three-dimensional (3D) mesh of a patient's dentition; creating a graph-based representation of the 3D mesh; applying the graph-based representation to a trained machine learning model of the computing device to recognize segmentation elements corresponding to segmentation of the patient's dentition; and outputting a segmented 3D model of the patient's dentition.

For example, a method of training a machine learning model to segment a 3D dental model may include: receiving, in a computing device, a three-dimensional (3D) mesh of a patient's dentition; extracting mesh features from the 3D mesh; coarsening the 3D mesh to reduce a size of the mesh; creating a graph-based representation of the coarsened 3D mesh with the extracted mesh features; and applying the mesh features and/or the graph-based representation to train a machine learning model of the computing device to recognize graph-based segmentation elements corresponding to segmentation of the patient's dentition.

Coarsening of the 3D mesh may include: computing a cosine similarity of the mesh features; eliminating mesh features with a cosine similarity below a first threshold; applying pooling to the remaining mesh features. Pooling may comprise Graclus pooling. In some examples pooling is repeated until a number of remaining nodes in the 3D mesh is less than or equal to a second threshold. In some examples the first threshold comprises 0.995; the second threshold may comprise 200,000.

All of the methods and apparatuses described herein, in any combination, are herein contemplated and can be used to achieve the benefits as described herein.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 3 is a flowchart describing one example of training a machine learning model to segment a 3D model of a patient's teeth.

FIG. 4 is a flowchart describing another example of training a machine learning model to segment a 3D model of a patient's teeth.

DETAILED DESCRIPTION

Figure 1A:
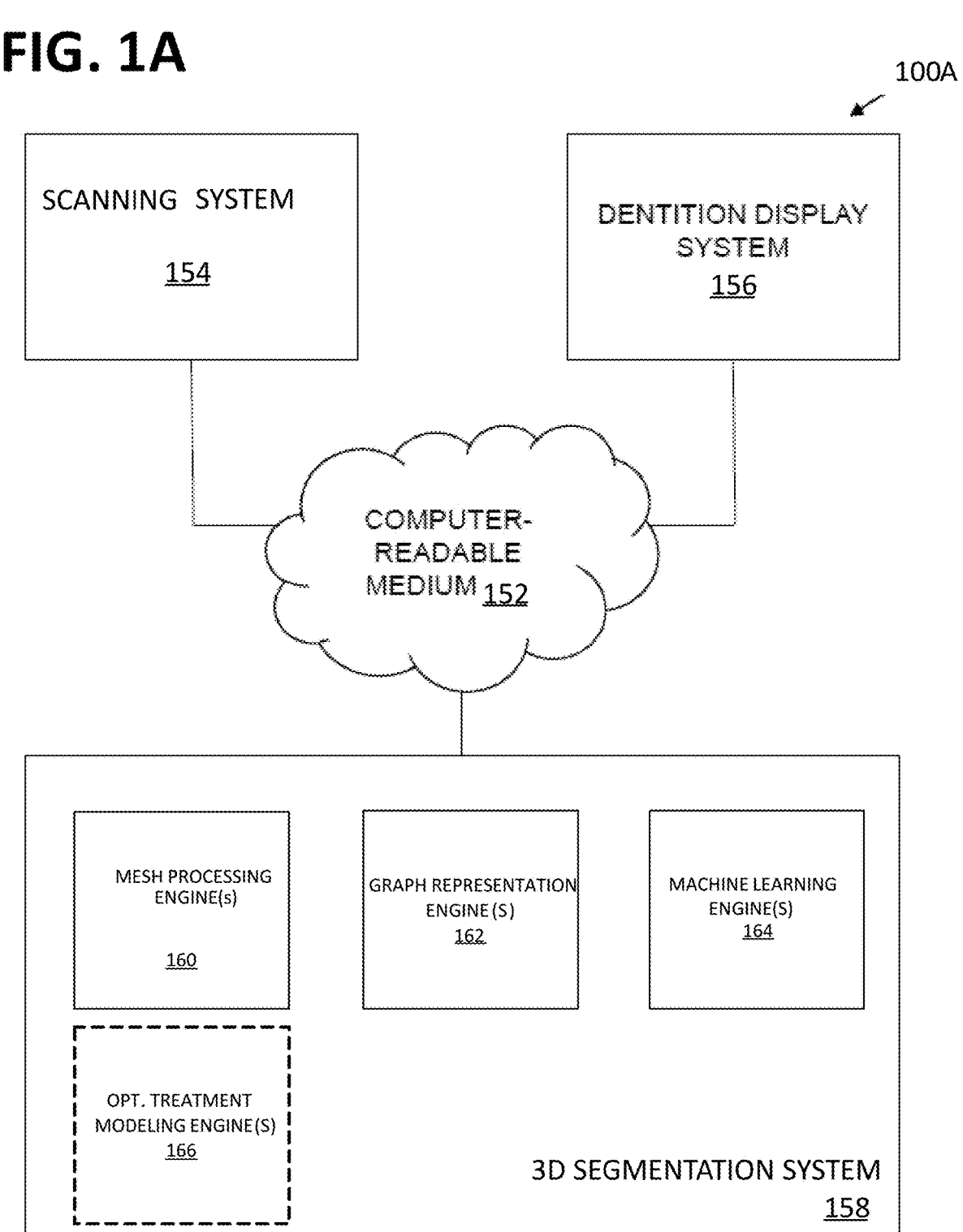
FIG. 1A is a diagram showing an example of a computing environment configured to digitally scan a dental arch and create a graph-based representation of the digital arch.

Described herein are apparatuses (e.g., systems, computing device readable media, devices, etc.) and methods for training a machine learning model to recognize "graph-based segmentation elements" corresponding to segmentation of patient's dentition. One object of the present disclosure is to use machine learning technology to provide an automatic segmentation system that can segment a 3D mesh of a patient's detention into individual teeth and dental features. The machine learning model can make this determination based upon data including patient demographics, tooth measurements, tooth surface mesh, processed tooth features, and historical patient data. These methods and apparatus can use this information to train a machine learning model and use the machine learning model to segment the patient's detention.

For example, described herein are apparatuses and/or methods, e.g., systems, including systems to automatically implement processes that incorporate a tooth segmentation system. When the system is triggered by a request for dental segmentation, the system can retrieve a 3D mesh of the patient's teeth from a local or remote database, identify mesh faces of the 3D mesh, identify face adjacency matrices associated with each mesh face of the mesh, and convert the information into a graph-based representation. The computed features can then be passed into the machine learning model, which may use machine learning technology (e.g., U-Net, Convolutional Neural Network (CNN), Decision Tree, Random Forest, Logistic Regression, Support Vector Machine, AdaBOOST, K-Nearest Neighbor (KNN), Quadratic Discriminant Analysis, Neural Network, etc.) to return a segmented model of the patient's detention. The parameters inputted into the machine learning model can be optimized with historic data. The results may be provided on demand and/or may be stored in a memory (e.g., database) for later use. In general, these methods and apparatuses (e.g., systems) may use graph based convolutions, e.g., graph convolutional networks.

For example, convolution on graphs may be defined through the graph Fourier transform. The graph Fourier transform may be defined as the projection on the eigenvalues of the Laplacian (e.g., the "vibration modes" of the graph). In some examples, a graph convolutional network may include several convolutional and pooling layers for feature extraction, followed by the final fully-connected layers. A polynomial parametrization may be used, for example, Chebyshev polynomials may be used to reduce the computational complexity.

The apparatuses and/or methods described herein may be useful in planning and fabrication of dental appliances, including elastic polymeric positioning appliances, is described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., San Jose, Calif., under the tradename, Invisalign System.

Throughout the body of the Description of Embodiments, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances."

A "patient," as used herein, may be any subject (e.g., human, non-human, adult, child, etc.) and may be alternatively and equivalently referred to herein as a "patient" or a "subject." A "patient," as used herein, may but need not be a medical patient. A "patient," as used herein, may include a person who receives orthodontic treatment, including orthodontic treatment with a series of orthodontic aligners.

The apparatuses and/or methods (e.g., systems, devices, etc.) described below can be used with and/or integrated into an orthodontic treatment plan. The apparatuses and/or methods described herein may be used to segment a patient's teeth from a three-dimensional model, such as a 3D mesh model or a 3D point cloud, and this segmentation information may be used to simulate, modify and/or choose between various orthodontic treatment plans. Segmenting the patient's teeth can be done automatically (e.g., using a computing device). For example, segmentation can be performed by a computing system automatically by evaluating data (such as three-dimensional scan, or a dental impression) of the patient's teeth or arch.

As described herein, an intraoral scanner may image a patient's dental arch and generate a virtual three-dimensional model of that dental arch. During an intraoral scan procedure (also referred to as a scan session), a user (e.g., a dental practitioner) of an intraoral scanner may generate multiple different images (also referred to as scans or medical images) of a dental site, model of a dental site, or other object. The images may be discrete images (e.g., point-and-shoot images) or frames from a video (e.g., a continuous scan). The three-dimensional scan can generate a 3D mesh model representing the patient's arch, including the patient's teeth and gums. Further computer processing as described herein can segment or separate the 3D mesh into individual teeth and gums.

An automated tooth segmentation system, as used herein, may include a system that uses automated agents to identify and/or number individual teeth and/or dental features of virtual representations of teeth, such as teeth represented in a three-dimensional dental mesh model resulting from a digital scan. The present disclosure presents one or more novel processes for identifying and segmenting a patient's teeth during a segmentation process. Some implementations herein may solve technical problems related to optimizing and/or increasing the accuracy and efficiency of digital dental scanning technologies.

FIG. 1A is a diagram showing an example of a computing environment 100A configured to facilitate gathering and processing digital scans of a dental arch with teeth therein. The environment 100A includes a computer-readable medium 152, a scanning system 154, a dentition display system 156, and a 3D mesh processing system 158. One or more of the modules in the computing environment 100A may be coupled to one another or to modules not explicitly shown.

The computer-readable medium 152 and other computer readable media discussed herein are intended to represent a variety of potentially applicable technologies. For example, the computer-readable medium 152 can be used to form a network or part of a network. Where two components are co-located on a device, the computer-readable medium 152 can include a bus or other data conduit or plane. Where a first component is co-located on one device and a second component is located on a different device, the computer-readable medium 152 can include a wireless or wired back-end network or LAN. The computer-readable medium 152 can also encompass a relevant portion of a WAN or other network, if applicable.

The scanning system 154 may include a computer system configured to scan a patient's dental arch. A "dental arch," as used herein, may include at least a portion of a patient's dentition formed by the patient's maxillary and/or mandibular teeth, when viewed from an occlusal perspective. A dental arch may include one or more maxillary or mandibular teeth of a patient, such as all teeth on the maxilla or mandible or a patient. The scanning system 154 may include memory, one or more processors, and/or sensors to detect contours on a patient's dental arch. The scanning system 154 may be implemented as a camera, an intraoral scanner, an x-ray device, an infrared device, etc. In some implementations, the scanning system 154 is configured to produce 3D scans of the patient's dentition. The scanning system 154 may include a system configured to provide a virtual representation of a physical mold of patient's dental arch. The scanning system 154 may be used as part of an orthodontic treatment plan. In some implementations, the scanning system 154 is configured to capture a patient's dental arch at a beginning stage, an intermediate stage, etc. of an orthodontic treatment plan. The scanning system 154 may be further configured to receive 3D scan data taken previously or by another system.

The dentition display system 156 may include a computer system configured to display at least a portion of a dentition of a patient. The dentition display system 154 may include memory, one or more processors, and a display device to display the patient's dentition. The dentition display system 156 may be implemented as part of a computer system, a display of a dedicated intraoral scanner, etc. In some implementations, the dentition display system 156 facilitates display of a patient's dentition using scans that are taken at an earlier date and/or at a remote location. It is noted the dentition display system 156 may facilitate display of scans taken contemporaneously and/or locally to it as well. As noted herein, the dentition display system 156 may be configured to display the intended or actual results of an orthodontic treatment plan applied to a dental arch scanned by the scanning system 154. The results may include 3D virtual representations of the dental arch, 2D images or renditions of the dental arch, etc.

The 3D segmentation system 158 may include a computer system, including memory and one or more processors, configured to process scan data from the scanning system 154. In some examples, the 3D scan data can be processed into a 3D model of the patient's teeth, such as a 3D mesh of the patient's teeth. In one implementation, the 3D segmentation system 158 is configured to process the 3D mesh to identify mesh features, including identifying mesh faces of the 3D mesh and identifying face adjacency matrices associated with each mesh face of the 3D mesh. The 3D segmentation system 158 may further be configured to convert the 3D model into a graph-based representation of the 3D model. The 3D segmentation system is also configured to input the graph-based representation into a machine learning model to train the machine learning model to identify "graph-based segmentation elements" corresponding to segmentation of a patient's detention. "Graph-based segmentation elements", as used herein, can refer to classes of features or structures within a graph-based representation of the 3D mesh that can be used to identify, label, and segment the 3D mesh into individual dental components, including individual teeth, interproximal spaces between teeth, and/or gingiva. The 3D segmentation system may perform additional processing on the graph-based representation, including performing pooling operations on the graph-based representation to create additional representations. The 3D segmentation system is further configured to use the trained machine learning model to automatically segment the 3D model into individual dental components, including segmenting the graph-based representation of the 3D model into individual teeth, interproximal spaces between teeth, and/or gingiva. The segmented 3D model can be used to create an implement a dental treatment plan for the patient. The 3D segmentation system 158 may include mesh processing engine(s) 160, graph representation engine(s) 162, machine learning engine(s) 164, and optional treatment modeling engine(s) 166. One or more of the modules of the 3D segmentation system 158 may be coupled to each other or to modules not shown.

The mesh processing engine(s) 160 of the 3D segmentation system 158 may implement automated agents to process 3D scans including 3D meshes taken by the scanning system 154. In some implementations, the mesh processing engine(s) 160 formats scan data from a scan of a dental arch into a 3D dental model (e.g., a 3D dental mesh model) of the dental arch. In other implementations, the mesh processing engine(s) 160 directly receives a 2D or 3D dental model, and processes the received model if necessary, into a 3D model of the appropriate format (e.g., a 3D mesh). The mesh processing engine(s) 160 may implement automated agents to identify mesh features from the 3D mesh. As is known in the art, a polygon mesh can include mesh features including vertices (e.g., a position in 3D space), edges (e.g., a connection between vertices), faces (e.g., a closed set of edges). In some implementations, the mesh processing engine(s) 160 is configured to identify mesh faces of the 3D mesh. In other implementations, the mesh processing engine(s) 160 is configured to identify or create face adjacency matrices associated with each mesh face of the 3D mesh. A face adjacency matrix can be used to indicate whether pairs of faces are adjacent or not in a 3D mesh. A face is considered adjacent to another face when the faces share a mesh edge.

Figure 2:
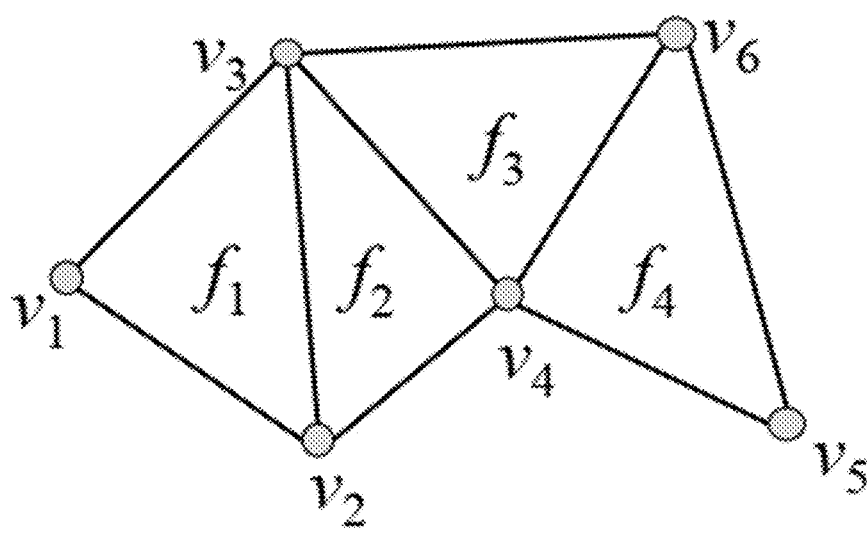
FIG. 2 is an example of a mesh with vertices and faces.

FIG. 2 is an example of a mesh having vertices v1, v2, v3, v4, v5, v6, and faces f1, f2, f3, and f4. A corresponding face adjacency matrix to the mesh of FIG. 2 is shown in table 1 below:

TABLE 1

|    | f1 | f2 | f3 | f4 |
|----|----|----|----|----|
| f1 | 0  | 1  | 0  | 0  |
| f2 | 1  | 0  | 1  | 0  |

TABLE 1-continued

|  | f1 | f2 | f3 | f4 |
|---|---|---|---|---|
| f3 | 0 | 1 | 0 | 1 |
| f4 | 0 | 0 | 1 | 0 |

The graph representation engine(s) 162 of the 3D segmentation system 158 can implement automated agents to create a graph-based representation based on the mesh features identified from the 3D mesh by the mesh processing engine. As described above, the mesh features may comprise mesh faces of a 3D mesh and/or face adjacency matrices associated with each mesh face of the 3D mesh. The graph-based representation can be formed by using mesh faces as nodes for the graph. Using mesh faces as nodes explicitly represents the features of the 3D mesh that require semantic segmentation. Furthermore, the face adjacency matrix can be used as edges for the graph. In some implementations, additional geometric features of the 3D mesh can be used as features of the graph nodes. For example, these features can include face-center location in Euclidean space, face-normals (e.g., the unit vector that is orthogonal to the face with a direction found based on the triangle's definition), color, curvature (e.g., the average change in the face normal between the face and its neighbors), and face area.

The graph-based representation of the 3D mesh and the mesh features can be used as an input to the machine learning engine(s) 164 of the 3D segmentation system 158.

The graph representation engine(s) 162 of the 3D segmentation system 158 may optionally perform additional operations on the graph-based representation. For example, the graph representation engine may implement automated agents to perform pooling operations on the graph-based representation of the 3D mesh. The pooling operations may comprise, for example, creating a new graph-based representation that is a subset of the original graph-based representation (e.g., combing mesh faces). Many approaches to pooling can be implemented, including TopK pooling, Edge-Pooling, Graph Clustering, or Graclus pooling. In some implementations, the pooling can include Euclidean Normalized Cuts where edge weights are based on the Euclidean distance of the features and the degree of the graph nodes involved in the edge.

In one implementation, the graph representation engine(s) 162 can implement the following additional operations on the graph-based representation. First, the mesh features can be normalized to have a mean of 0 and standard deviation of 1. Next, the graph representation engine(s) 162 may implement automated agents to reduce the size/complexity of the 3D mesh and/or the graph-based representation of the mesh. For example, this can include computing the cosine similarity of the mesh features between the nodes connected by each edge. Any edge where the cosine similarity is less than a threshold (e.g., 0.995 in segmentation work) can be dropped because the nodes are considered too dissimilar to pool. The graph representation engine can then implement automated agents to perform Graclus pooling using the remaining edges with the cosine similarity as the edge weighting. Features for the new clusters can then be found as the average of the constituent nodes. This process can be repeated by the graph representation engine until the number of nodes is less than or equal to a "maxfaces" parameter. Pooling nodes (mesh faces) which are very similar can then be used to reduce the overall number of nodes without there being a significant likelihood of pooling across labels, since in a geometric network a label should not change where two highly similar nodes are adjacent to one another. On average, this mesh size reduction introduces less than 0.05% error. Moreover because Graclus pooling computes a cluster mapping, the graph representation engine can maintain a single layout which maps the original mesh faces onto coarsened nodes even through multiple iterations of the algorithm, thus meeting all of the requirements for simplification.

The machine learning engine(s) 164 may implement automated agents to train a machine learning model with the graph-based representation, including the mesh features from mesh processing engine(s) 160, to recognize "graph-based segmentation elements" corresponding to segmentation of a patient's detention. As described above, "graph-based segmentation elements" can refer to classes of features or structures within the 3D models that can be used to identify, label, and segment the 3D models into individual dental components, including individual teeth, interproximal spaces between teeth, and/or gingiva. Graph based convolutions may be used. In some implementations, the machine learning engine(s) 164 is configured to use the input from the mesh processing engine(s) 160 and/or the graph representation engine(s) 162 to train a convolutional network (including a graph convolutional network) to recognize "graph-based segmentation elements". All the input features from the graph-based representation can contribute to machine learning model and are analogous to the Red, Green, and Blue color channels used in images.

In other implementations, a human technician's manual segmentation of scan data can be input as a ground truth into the machine learning model, and the machine learning model can be trained to achieve the ground truth as the output for a corresponding input. The machine learning models weights can be adjusted to minimize the error between the output and the ground truth as the machine learning model is trained.

The machine learning engine(s) 164 may be trained to construct a semantic segmentation network from the input to identify "graph-based segmentation elements" in which multiple objects of the same class are treated as a single entity. For example, all features linked to a segmentation element label of "teeth" can be identified as teeth, all features linked to a segmentation element label of "interproximal spaces", can be identified as interproximal spaces, and all features linked to a segmentation element label of "gingiva" can be identified as gingiva. Furthermore, the machine learning engine(s) 164 may be trained to construct an instance segmentation network to identify "graph-based segmentation elements" in which multiple objects of the same class are treated as distinct individual objects or instances. In one specific implementation, the image-based network, Mask RCNN comprises a region proposal network, an instance classifier, and an instance mask. This style of network can be implemented with a graph-based representation that results in a network that accurately finds a 3D mask of each tooth and classifies each tooth. Alternatively, each instance proposal could be classified with a separate approach. In this implementation, the 3D model can be segmented using an instance segmentation combined with an instance classification.

Examples of machine learning systems that may be used include, but are not limited to, Convolutional Neural Networks (CNN) such as U-Net, ResNeXt, Xception, RefineNet, Kd-Net, SO Net, Point Net, or Point CNN, and additional machine learning systems such as Decision Tree, Random Forest, Logistic Regression, Support Vector Machine, AdaBoosT, K-Nearest Neighbor (KNN), Quadratic Discriminant Analysis, Neural Network, etc. Additionally, the variations of the CNNs described above can be implanted. For example, a CNN such as Unet can be modified to use alternative convolutional blocks (e.g., ResNeXt or Xception) instead of the VGG-style blocks that are implemented by default.

In some implementations, the machine learning engine(s) 164 can use a U-Net neural network. A standard U-Net typically includes 5 layers and 4 downsamplings. In Graph U-Nets, an even shallower network is typically used. In this disclosure, it may be desirable to increase the number of layers and downsamplings (as permitted by available memory) to improve the results. In one specific implementation, up to 9 layers with 8 downsamplings can be used, resulting in $\frac{1}{256}^{th}$ the number of nodes at the lowest layer of the network. The graph-based representations described herein include a large number of nodes, which require a large receptive field in order to accurately process.

In addition to increasing the depth of the U-Net as described above, another technique to increase the receptive field size of the network is to increase the degree of the Chebyshev expansion of the spectral convolution. The challenge with increasing the degree of the Chebyshev expansion is that the amount of memory required grows linearly with degree, K. At the top layers of the U-Net, the number of nodes is large enough that K 2 leaves little GPU memory for deeper layers. A compromise developed herein is to increase the degree of K in the spectral convolution as one proceeds deeper into the network. Since the number of graph nodes is reduced by a factor of two after each pooling, there is additional GPU memory available for the increase in K. Table 2 provides one example of the full architecture that can be used:

TABLE 2

| Level | Scale | K | Size |
|---|---|---|---|
| 1 | 1 | 1 | 1 |
| 2 | $\frac{1}{2}$ | 2 | 1 |
| 3 | $\frac{1}{4}$ | 3 | $\frac{3}{4}$ |
| 4 | $\frac{1}{8}$ | 4 | $\frac{1}{2}$ |
| 5 | $\frac{1}{16}$ | 5 | $\frac{5}{16}$ |
| 6 | $\frac{1}{32}$ | 6 | $\frac{3}{16}$ |
| 7 | $\frac{1}{64}$ | 7 | $\frac{7}{64}$ |
| 8 | $\frac{1}{128}$ | 8 | $\frac{1}{16}$ |
| 9 | $\frac{1}{256}$ | 9 | $\frac{9}{256}$ |

Additionally, the machine learning engine(s) 164 can normalize the inputs to have a mean of 0 and a standard deviation of 1.0. in one implementation, the machine learning engine(s) 164 can implement a SELU activation function for batch normalization. The SELU activation function is defined as:

$$selu(x) = \lambda \begin{cases} x, & \text{if } x > 0 \\ \alpha e^x - \alpha, & \text{if } x \le 0 \end{cases}$$

where $\lambda$ and $\alpha$ are chosen to provide a fixed-point attractor so that learned weights will produce outputs that have a mean of 0 and standard deviation of 1. A graph-based representation with SELU results in faster learning and better generalization.

The machine learning engine(s) 164, including the trained machine learning model, may also be configured to automatically segment the 3D model or the graph-based representation of the 3D model into individual dental components, including segmenting into individual teeth, interproximal spaces between teeth, and/or gingiva. The segmentation results may comprise data points in 3D space that depict teeth and/or other elements or features of the dental arch in a format that can be rendered on the dentition display system 156. For example, individual teeth may be identified and numbered. Additional dental features, such as gingiva and the interproximal spaces between teeth may also be identified and labeled. In some implementations, the machine learning engine(s) 164 can be used to automatically segment the 3D model while the machine learning model is being trained. In other implementations, the machine learning engine(s) can simply input a 3D model or 3D mesh into an already trained machine learning model to provide a segmentation output. In addition to individual segmentation determinations, the machine learning engine(s) 164 can produce an output that includes a score or probability that indicates the accuracy of the segmentation output.

In some implementations, the machine learning engine(s) 164 may implement automated agents to apply algorithmic postprocessing to the output of the trained machine learning model to improve the predicted segmentation score or probability of accuracy. For example, some segmentation outputs can include segmentation solutions in which one or more teeth numbers may be assigned to a particular region or subset of data in the 3D model or 3D mesh. An algorithmic postprocessing approach can sum the probabilities of individual teeth being assigned to the particular region to identify the segmentation output with the highest probability of being accurate.

The optional treatment modeling engine(s) 166 may be configured to use the segmented 3D model to store and/or provide instructions to implement orthodontic treatment plans and/or the results of orthodontic treatment plans. The optional treatment modeling engine(s) 166 may provide the results of orthodontic treatment plans on a 3D model. In some embodiments, the 3D model can be rendered into one or more 2D image(s) from a plurality of viewing angles. The optional treatment modeling engine(s) 166 may model the results of application of orthodontic aligners to the patient's dental arch over the course of an orthodontic treatment plan.

As used herein, any "engine" may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used herein, "datastores" may include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Data-store-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

Figure 1B:
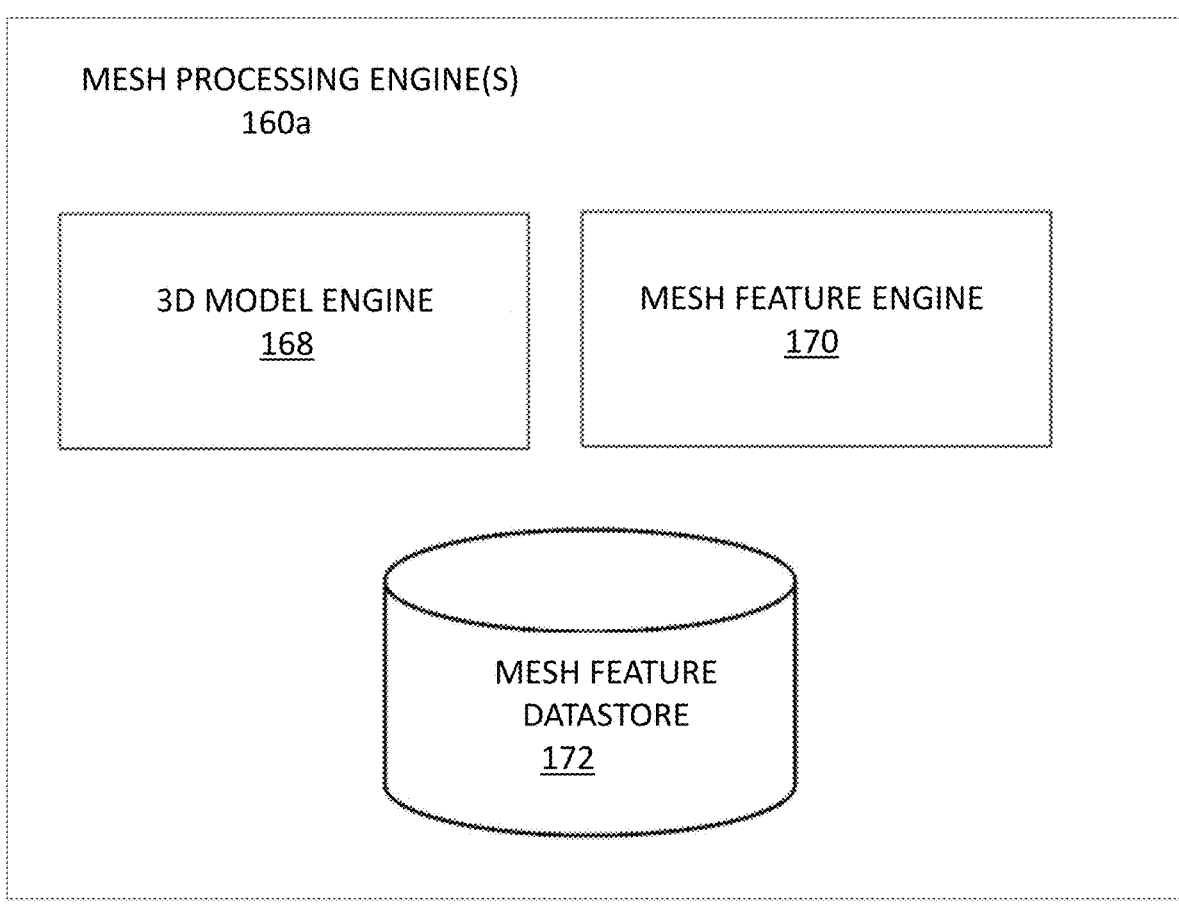
FIG. 1B is a diagram showing an example of mesh processing engine(s).

FIG. 1B is a diagram showing an example of a mesh processing engine(s) 160a. The mesh processing engine(s) 160a may include a 3D model engine 168, a mesh feature engine 170, and a mesh feature datastore 172. One or more of the modules of the mesh processing engine(s) 160a may be coupled to each other or to modules not shown.

The 3D model engine 168 may implement one or more automated agents configured to format 2D or 3D scan data from a scan of a dental arch into a 3D model (e.g., a 3D dental mesh model, etc.) of the dental arch. The 3D mesh of the dental arch may comprise a collection of vertices, edges, and/or faces that depict teeth and/or other elements of the dental arch in a format that can be rendered on the dentition display system 156. The 3D model engine 168 may provide 3D models and/or other data to the mesh feature engine 170 and the mesh feature datastore 172.

The mesh feature engine 170 may implement automated agents to extract or identify mesh features from the 3D mesh of the patient's teeth. In some implementations, the mesh feature engine is configured to identify mesh faces of the 3D mesh. In other implementations, the mesh feature engine is configured to identify or create face adjacency matrices associated with each mesh face of the 3D mesh. A face adjacency matrix can be used to indicate whether pairs of faces are adjacent or not in a 3D mesh. A face is considered adjacent to another face when the faces share a mesh edge. Additional geometric features of the 3D mesh can be extracted by the mesh feature engine. For example, these features can include face-center location in Euclidean Euclidean space, face-normals (e.g., the unit vector that is orthogonal to the face with a direction found based on the triangle's definition), color, curvature (e.g., the average change in the face normal between the face and its neighbors), and face area.

The mesh feature datastore 172 may be configured to store data related to the 3D mesh, including the mesh features described above.

Figure 1C:
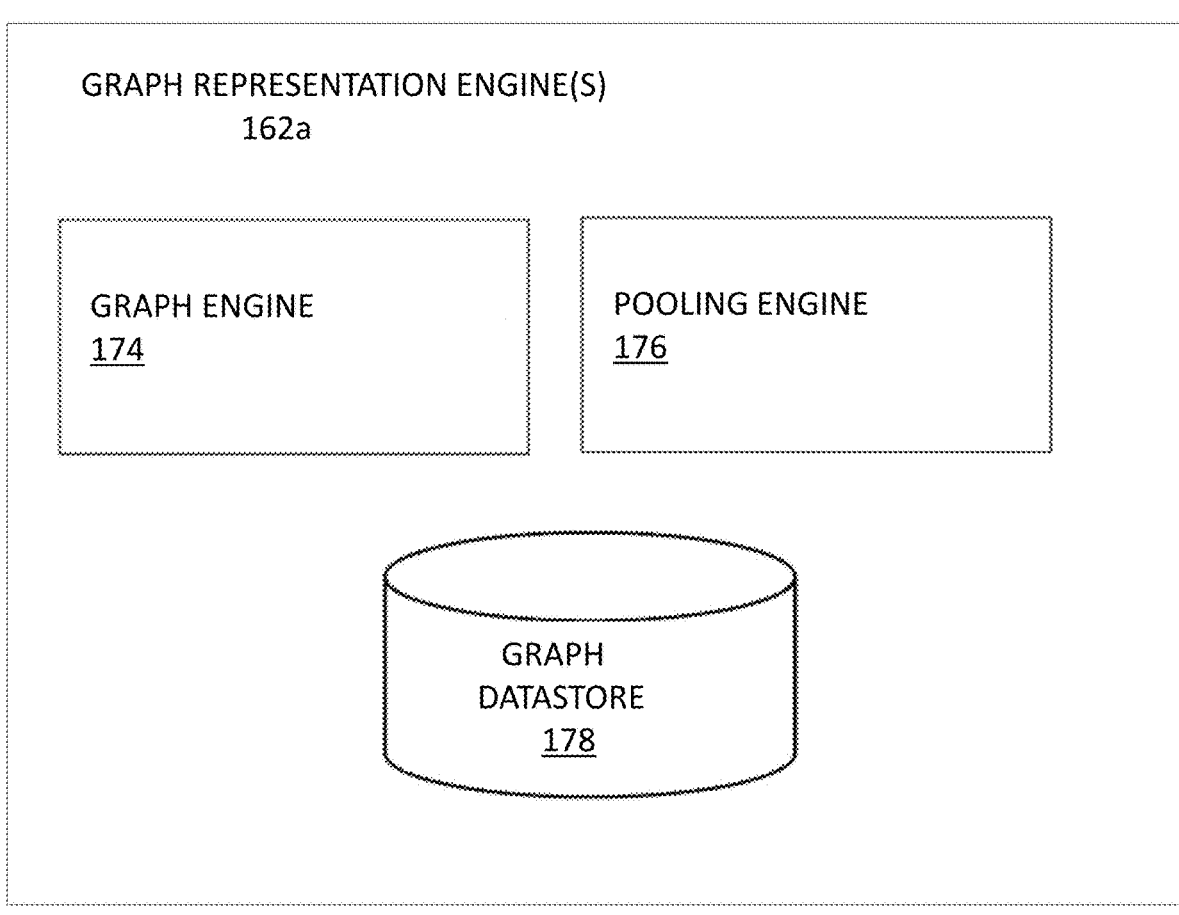
FIG. 1C is a diagram showing an example of graph representation engine(s).

FIG. 1C is a diagram showing an example of a graph representation engine(s) 162a. The graph representation engine(s) 162a may include graph engine 174, pooling engine 176, and graph datastore 178. One or more of the modules of the graph representation engine(s) 162a may be coupled to each other or to modules not shown.

The graph engine 174 may implement one or more automated agents configured to create a graph-based representation of the 3D mesh based on mesh features from the mesh processing engine(s) 160a. In one implementation, the graph-based representation can be formed by using mesh faces as nodes for the graph. Using mesh faces as nodes explicitly represents the features of the 3D mesh that require semantic segmentation. Furthermore, the face adjacency matrix can be used as edges for the graph. In some implementations, additional geometric features of the 3D mesh can be used as features of the graph nodes. For example, these features can include face-center location in Euclidean space, face-normals (e.g., the unit vector that is orthogonal to the face with a direction found based on the triangle's definition), color, curvature (e.g., the average change in the face normal between the face and its neighbors), and face area.

The pooling engine 176 may implement one or more automated agents configured to perform additional operations on the graph-based representation from the graph engine 174. In one implementation, the additional operations can include normalizing the mesh features and/or performing pooling operations on the graph-based representation. The pooling operations can be repeated until the appropriate number of nodes remains in the graph-based representation.

The graph datastore 178 may be configured to store data related to the graph-based representation, the mesh features, the normalized mesh features and graph-based representation, and the representations resulting from pooling operations from the modules described above.

Figure 1D:
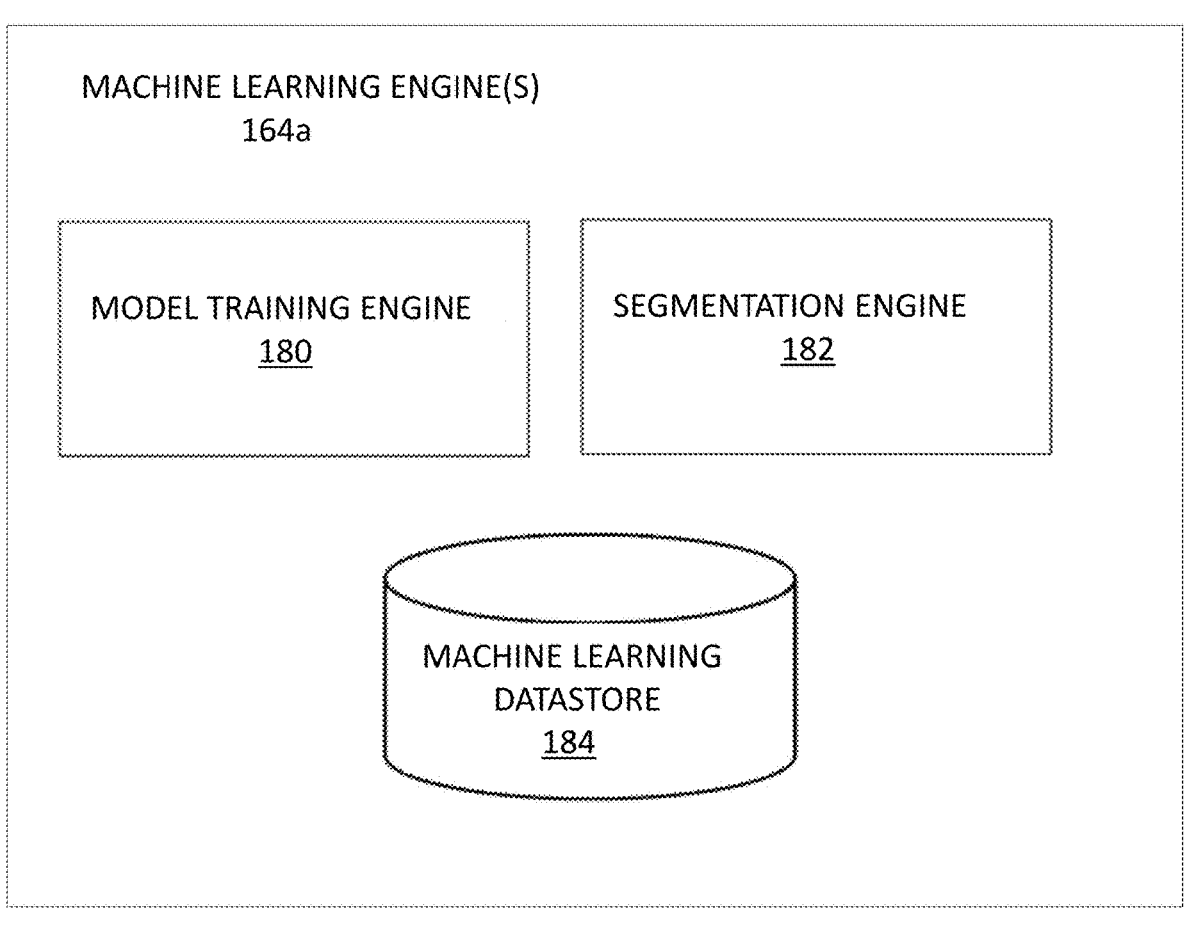
FIG. 1D is a diagram showing an example of a machine learning engine(s).

FIG. 1D is a diagram showing an example of the machine learning engine(s) 164a. The machine learning engine(s) 164a may acquire 2D or 3D scan data, 3D mesh data, graph-based representations of the 3D mesh data, mesh features, and normalized/pooled features or representations from the graph representation engine(s) and mesh processing engine(s) described above. The machine learning engine(s) 164a may include a model training engine 180, a segmentation engine 182, and a machine learning datastore 184.

The model training engine 180 may implement one or more automated agents configured to use machine learning techniques to train a machine learning model to recognize "graph-based segmentation elements" in an input comprising a 3D mesh or a graph-based representation of the 3D mesh. Multiple training cases comprising graph-based representations and mesh features from various patients can be used to train the model. In some implementations, the model training engine 180 is configured to use these inputs to train a convolutional network to recognize "graph-based segmentation elements". The model training engine 180 may be trained to construct a semantic segmentation network from the input to identify "graph-based segmentation elements" in which multiple objects of the same class are treated as a single entity. Furthermore, the model training engine 180 may be trained to construct an instance segmentation network to identify "graph-based segmentation elements" in which multiple objects of the same class are treated as distinct individual objects or instances.

In one implementation of training the machine learning model, a technician can evaluate 2D or 3D scan data, or a 3D model of patients' dentitions, and manually identify "graph-based segmentation elements" in the data. For example, the technician can identify individual teeth, gingiva, and/or interproximal spaces between teeth. The technician can individually label and/or number each tooth and the gingiva. For example, the technician can label the individual teeth (e.g., assign numbers 1-16 for the different types of teeth) and apply a separate label (e.g., the number 17) for the gingiva. The technician's evaluation can then be input into the machine learning model as the "ground truth", which is the desired output of the machine learning model for a given input. Therefore, the machine learning model can be trained to achieve the technician's evaluation as an output for a given graph-based representation input. The weights of the machine learning model can be adjusted to minimize the error between the ground truth and the output of the model. This technique can be used to train the machine learning model to identify individual teeth, including identifying the type of teeth, and also to identify the gingiva and/or interproximal spaces between teeth.

Examples of machine learning systems that may be used by the model training engine include, but are not limited to, Convolutional Neural Networks (CNN) such as U-Net, ResNeXt, Xception, RefineNet, Kd-Net, SO Net, Point Net, or Point CNN, and additional machine learning systems such as Decision Tree, Random Forest, Logistic Regression, Support Vector Machine, AdaBoosT, K-Nearest Neighbor (KNN), Quadratic Discriminant Analysis, Neural Network, etc. Additionally, the variations of the CNNs described above can be implanted. For example, a CNN such as Unet can be modified to use alternative convolutional blocks (e.g., ResNeXt or Xception) instead of the VGG-style blocks that are implemented by default.

The segmentation engine 182 may implement one or more automated agents configured to use the trained machine learning model to automatically segment the 3D mesh or a graph-based representation of the 3D mesh into individual dental components, including segmenting the graph-based representation of the 3D mesh into individual teeth, interproximal spaces between teeth, and/or gingiva. In some implementations, the segmentation engine 182 can be configured to adjust the size and/or shape of individual teeth in the 3D model to imitate the predicted interproximal spaces between those teeth.

The segmentation results may comprise data points in 3D space that depict teeth and/or other elements or features of the dental arch. For example, individual teeth may be identified and numbered. Additional dental features, such as gingiva and the interproximal spaces between teeth may also be identified and labeled. In some implementations, the segmentation output can include a score or a probability that the output is accurate.

If semantic segmentation is implemented in the machine learning model, the segmentation engine 182 may provide an output that identifies dental objects of the same class (e.g., teeth, gingiva, interproximal spaces) as a single entity. For example, all teeth, interproximal spaces, and gingiva can be grouped and identified as such. Alternatively, if instance segmentation is implemented in the machine learning model, the segmentation engine 182 may provide an output that identifies multiple dental objects of the same class (e.g., teeth, gingiva, interproximal spaces) as distinct individual objects or instances. The distinct individual objects can be, for example, individually numbered or labeled in the output. The output from the segmentation engine may be used to automatically and accurately label the individual teeth of the 3D model, e.g., by numbering the teeth in a standard tooth numbering. In some implementations, the 3D mesh itself, or the graph-based representation of the 3D mesh can be updated to incorporate the output of the segmentation engine, including numbering the individual teeth and/or labeling the gingiva or interproximal spaces between teeth.

The machine learning datastore 184 may be configured to store data related to the output of the machine learning engine(s), including the "graph-based segmentation elements", or the segmented output of the 3D mesh or the graph-based representation of the 3D mesh, or a segmentation score or probability from the modules described above.

FIG. 3 illustrates one example of a method for training a machine learning model to segment a 3D model or 3D mesh of a patient's teeth. This method may be automatically implemented by a system, such as one or more of the systems in the computing environment 100A, shown in FIG. 1A. At an operation 302, the system may automatically receive three-dimensional (3D) meshes of various patients' dental arches. The models may be generated from a scan collected directly from the patients (e.g., using an intraoral scanner) or indirectly (e.g., by scanning a mold of the patients' dentition and/or by receiving digital models of the patients taken by another, etc.). Although only a single data set is required to train the model, multiple training cases can improve the model training and increase the accuracy of the machine learning model in identifying "graph-based segmentation elements".

At an operation 304, the system may automatically extract mesh features from the 3D meshes. The mesh features can comprise, for example, mesh faces of the 3D meshes and/or face adjacency matrices associated with each mesh face of the 3D meshes. The mesh features can further include face-center location in Euclidean space, face-normals (e.g., the unit vector that is orthogonal to the face with a direction found based on the triangle's definition), color, curvature (e.g., the average change in the face normal between the face and its neighbors), and face area.

At an operation 306, the system may automatically convert the 3D meshes into graph-based representations of the 3D meshes with parameters that represent the patients' dentitions. The graph-based representation of the 3D meshes can be created with the extracted mesh features from operation 304. In one implementation, the graph-based representation can be formed by using mesh faces as nodes for the graph. Using mesh faces as nodes explicitly represents the features of the 3D mesh that require semantic segmentation. Furthermore, the face adjacency matrix can be used as edges for the graph.

At an operation 308, the system may use the graph-based representation and/or the mesh features to train a machine learning model to recognize "graph-based segmentation elements" corresponding to segmentation of a patient's dentition. As described above, "graph-based segmentation elements" can refer to classes of features or structures within the 3D meshes that can be used to identify, label, and segment the 3D mesh into individual dental components, including individual teeth, interproximal spaces between teeth, and/or gingiva. Multiple training cases comprising computed features can be input into the machine learning model to further train the model. In some examples, the inputs are used to train a submanifold convolutional neural network to recognize "graph-based segmentation elements". In other embodiments, other convolution techniques can be used, including dense convolutional networks and hybrid approaches in which a sparse convolutional network is used at high levels and a dense convolutional network is used when the size of the input is reduced. In some examples, the machine learning model is trained to construct a semantic segmentation network. In other embodiments, the machine learning model is trained to construct an instance segmentation network.

At an optional operation 310, the system can use the trained machine learning model from operation 308 to segment a 3D model input into individual dental components. For example, a 3D mesh or a graph-based representation of a 3D model can be input into the trained machine learning model to produce a segmentation output that identifies and/or labels individual dental components of the 3D model, including identifying and/or labeling individual teeth, gingiva, and interproximal spaces between teeth.

FIG. 4 illustrates one example of a method for training a machine learning model to segment a 3D model of a patient's teeth with a technician's manual segmentation as a "ground truth" input. This method may be automatically implemented by a system, such as one or more of the systems in the computing environment 100A, shown in FIG. 1A. At an operation 402, the system may automatically receive three-dimensional (3D) meshes of various patients' dental arches. The models may be generated from a scan collected directly from the patients (e.g., using an intraoral scanner) or indirectly (e.g., by scanning a mold of the patients' dentition and/or by receiving digital models of the patients taken by another, etc.). Although only a single data set is required to train the model, multiple training cases can improve the model training and increase the accuracy of the machine learning model in identifying "segmentation elements".

At an operation 404, the system may create graph-based representations of 3D meshes with extracted mesh features. Operation 404 may include the steps and features described above in operations 304 and 306 of FIG. 3.

At an operation 406, the system may receive a technician's manual segmentation of the graph-based representation of the 3D mesh. The manual segmentation can comprise an evaluation by a technician of the 3D meshes and/or the graph-based representations, that includes identification of "graph-based segmentation elements" in the data, including individual teeth, gingiva, and/or interproximal spaces between teeth. The manual segmentation can further comprise labels for the individual teeth (e.g., assigned numbers 1-16 for the different types of teeth) and a separate label (e.g., the number 17) for the gingiva.

At an operation 408, the system may use the "ground truth" (e.g., the technician's manual segmentation of the 3D model) to train a machine learning model to recognize "graph-based segmentation elements" corresponding to segmentation of a patient's dentition. As described above, "graph-based segmentation elements" can refer to classes of features or structures within the 3D models that can be used to identify, label, and segment the 3D models into individual dental components, including individual teeth, interproximal spaces between teeth, and/or gingiva. Multiple training cases comprising a "ground truth" can be input into the machine learning model to further train the model. In some examples, the weights of the machine learning model can be adjusted while training to minimize the error between the ground truth and the output of the model.

At an optional operation 410, the system can use the trained machine learning model from operation 408 to segment a 3D model input into individual dental components. For example, a 3D mesh or a graph-based representation of a 3D mesh can be input into the trained machine learning model to produce a segmentation output that identifies and/or labels individual dental components of the 3D model, including identifying and/or labeling individual teeth, gingiva, and interproximal spaces between teeth. In some implementations, the size and/or shape of individual teeth in the 3D model can be adjusted to account for the predicted interproximal spaces between those teeth.

Figure 5:
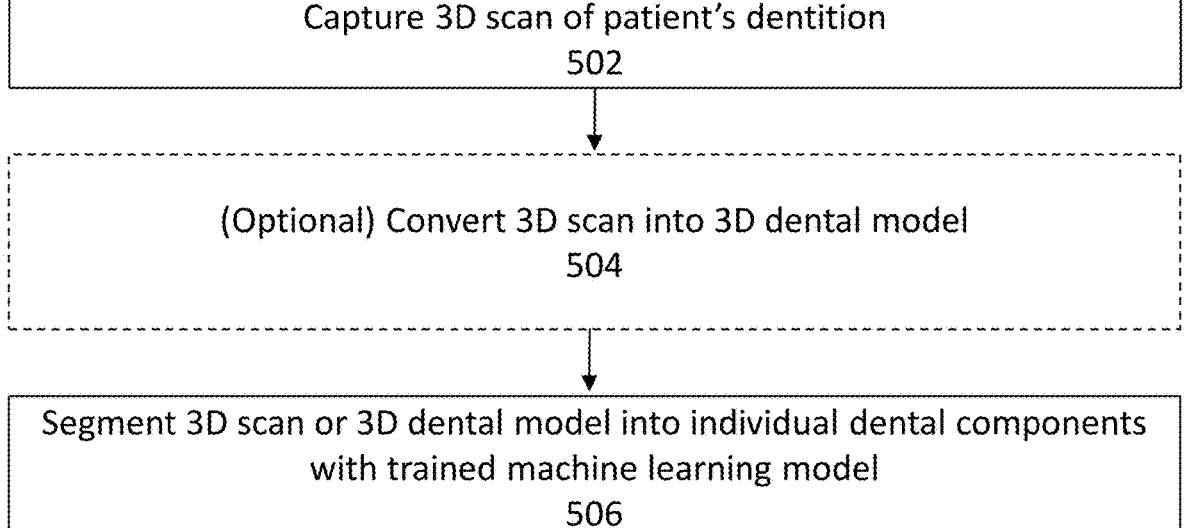
FIG. 5 is another flowchart describing one example of a method of segmenting a 3D scan or 3D model of a patient's teeth into individual dental components.

FIG. 5 is another flowchart that illustrates one example of a method of segmenting a 3D scan or 3D model of a patient's teeth into individual dental components. The method of FIG. 5 is similar to the methods described above with respect to FIGS. 3 and 4, except the method of FIG. 5 relies on the trained machine learning models from FIGS. 3 and 4. This method may be automatically implemented by a system, such as one or more of the systems in the computing environment 100A, shown in FIG. 1A. At an operation 502, the system may capture three-dimensional (3D) scans of a patient's dental arch. The 3D scan may be generated from a scan collected directly from the patients (e.g., using an intraoral scanner) or indirectly (e.g., by scanning a mold of the patients' dentition and/or by receiving digital models of the patients taken by another, etc.).

At an optional operation 504, the system can convert the 3D scan into a 3D dental model. The 3D dental model can comprise, for example, a 3D mesh model, or a graph-based representation of the 3D mesh model.

At an operation 506, the system can use a trained machine learning model to segment a 3D model input into individual dental components. For example, a 3D mesh model or a graph-based representation of a 3D mesh can be input into the trained machine learning model to produce a segmentation output that identifies and/or labels individual dental components of the 3D model, including identifying and/or labeling individual teeth, gingiva, and interproximal spaces between teeth.

Figure 6:
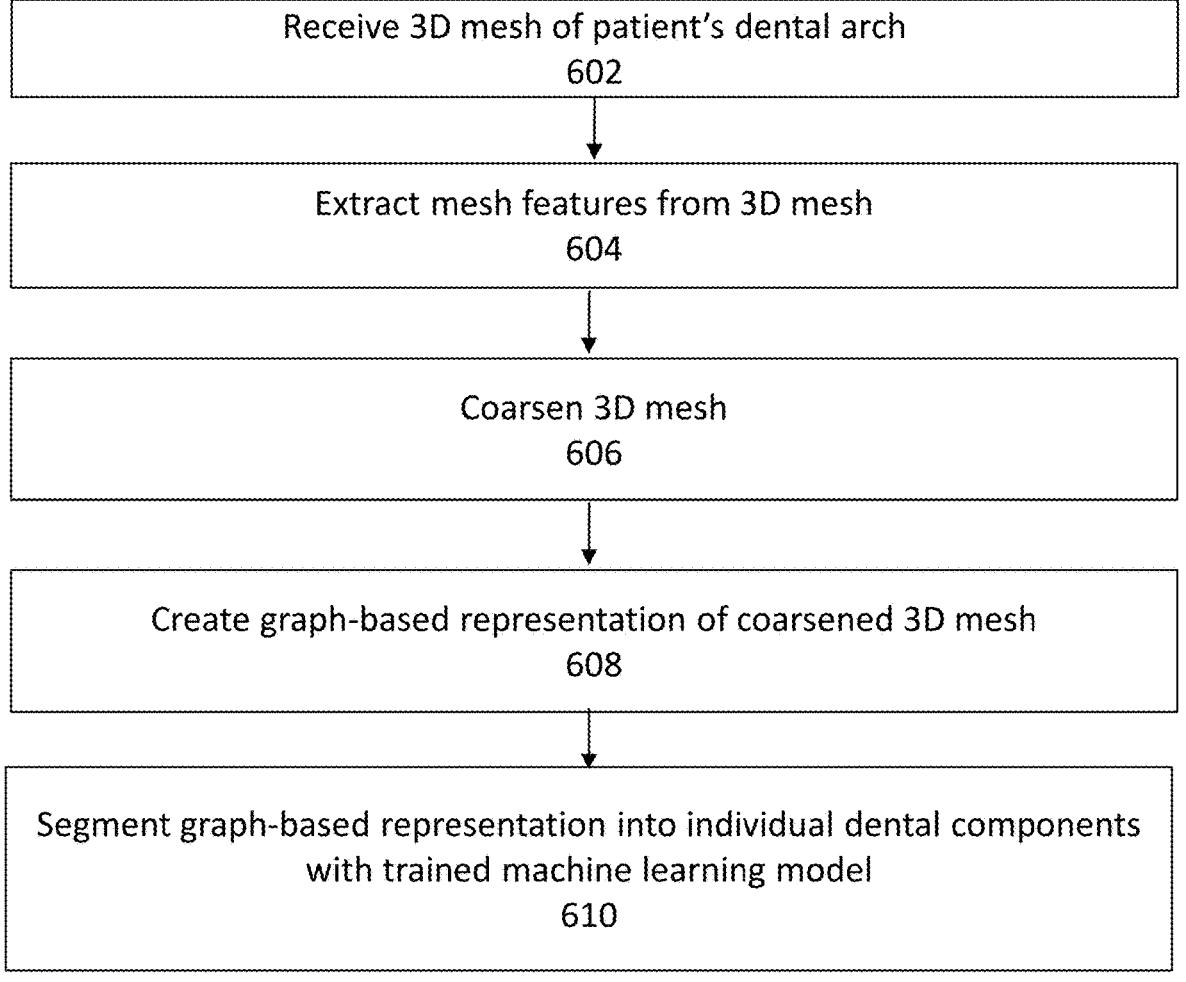
FIG. 6 is another flowchart describing an example of a method of segmenting a 3D scan or 3D model of a patient's teeth into individual dental components.

FIG. 6 illustrates one example of a method for training a machine learning model to segment a 3D model or 3D mesh of a patient's teeth. This method may be automatically implemented by a system, such as one or more of the systems in the computing environment 100A, shown in FIG. 1A. At an operation 602, the system may automatically receive a three-dimensional (3D) mesh of a patient's dental arch. The 3D mesh may be generated from a scan collected directly from the patient (e.g., using an intraoral scanner) or indirectly (e.g., by scanning a mold of the patient's dentition and/or by receiving digital models of the patient taken by another, etc.).

At an operation 604, the system may automatically extract mesh features from the 3D mesh. The mesh features can comprise, for example, mesh faces of the 3D meshes and/or face adjacency matrices associated with each mesh face of the 3D meshes. The mesh features can further include face-center location in Euclidean space, face-normals (e.g., the unit vector that is orthogonal to the face with a direction found based on the triangle's definition), color, curvature (e.g., the average change in the face normal between the face and its neighbors), and face area.

At an operation 606, the system may automatically coarsen the 3D mesh. Coarsening the 3D mesh can reduce the size/complexity of the 3D mesh and/or the graph-based representation of the mesh. For example, this can include computing the cosine similarity of the mesh features between the nodes connected by each edge. Any edge where the cosine similarity is less than a threshold (e.g., 0.995 in segmentation work) can be dropped because the nodes are considered too dissimilar to pool. The graph representation engine can then implement automated agents to perform Graclus pooling using the remaining edges with the cosine similarity as the edge weighting. Features for the new clusters can then be found as the average of the constituent nodes. This process can be repeated by the graph representation engine until the number of nodes is less than or equal to a "maxfaces" parameter. Pooling nodes (mesh faces) which are very similar can then be used to reduce the overall number of nodes without there being a significant likelihood of pooling across labels, since in a geometric network a label should not change where two highly similar nodes are adjacent to one another. On average, this mesh size reduction introduces less than 0.05% error. Moreover because Graclus pooling computes a cluster mapping, the graph representation engine can maintain a single layout which maps the original mesh faces onto coarsened nodes even through multiple iterations of the algorithm, thus meeting all of the requirements for simplification.

At an operation 608, the system may automatically convert the coarsened 3D mesh from operation 606 into a graph-based representations of the 3D mesh with parameters that represent the patients' dentitions. The graph-based representation of the 3D mesh can be created with the extracted mesh features from operation 604. In one implementation, the graph-based representation can be formed by using mesh faces as nodes for the graph. Using mesh faces as nodes explicitly represents the features of the 3D mesh that require semantic segmentation. Furthermore, the face adjacency matrix can be used as edges for the graph.

Figures 7A, 7B:
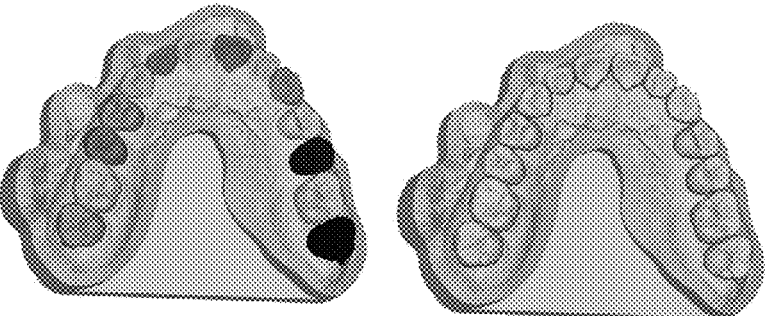
FIGS. 7A-7B shows examples types segmentation outputs.

At an operation 610, the system can use a trained machine learning model to segment the coarsened 3D mesh or the graph-based representation to produce a segmentation output that identifies and/or labels individual dental components of the 3D model, including identifying and/or labeling individual teeth, gingiva, and interproximal spaces between teeth. In some implementations, this segmentation output can include segmented teeth (FIG. 7A) and/or teeth outlines (FIG. 7B).

Figure 8:
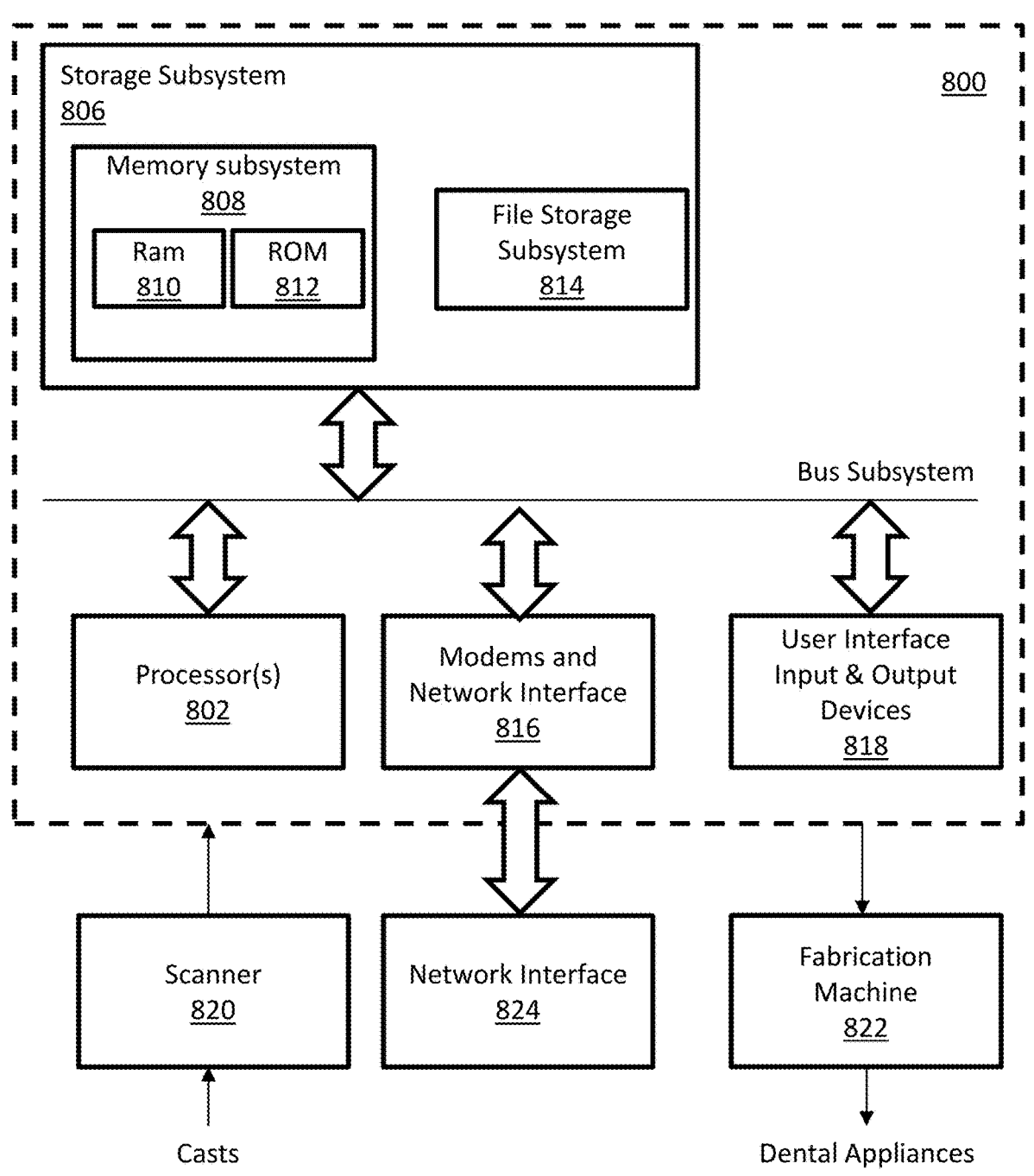
FIG. 8 is a simplified block diagram of a data processing system that may perform the methods described herein.

The methods described herein may be performed by an apparatus, such as a data processing system, which may include hardware, software, and/or firmware for performing many of these steps described above. For example, FIG. 8 is a simplified block diagram of a data processing system 800. Data processing system 800 typically includes at least one processor 802 which communicates with a number of peripheral devices over bus subsystem 804. These peripheral devices typically include a storage subsystem 806 (memory subsystem 808 and file storage subsystem 814), a set of user interface input and output devices 818, and an interface to outside networks 816, including the public switched telephone network. This interface is shown schematically as "Modems and Network Interface" block 816 and is coupled to corresponding interface devices in other data processing systems over communication network interface 824. Data processing system 800 may include a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 806 maintains the basic programming and data constructs that provide the functionality of the present invention. The software modules discussed above are typically stored in storage subsystem 806. Storage subsystem 806 typically comprises memory subsystem 808 and file storage subsystem 814.

Memory subsystem 808 typically includes a number of memories including a main random access memory (RAM) 810 for storage of instructions and data during program execution and a read only memory (ROM) 812 in which fixed instructions are stored. In the case of Macintosh-compatible personal computers the ROM would include portions of the operating system; in the case of IBM-compatible personal computers, this would include the BIOS (basic input/output system).

File storage subsystem 814 provides persistent (nonvolatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 804 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 820 is responsible for scanning casts of the patient's teeth obtained either from the patient or from an orthodontist and providing the scanned digital data set information to data processing system 800 for further processing. In a distributed environment, scanner 820 may be located at a remote location and communicate scanned digital data set information to data processing system 800 over network interface 824.

Fabrication machine 822 fabricates dental appliances based on intermediate and final data set information acquired from data processing system 800. In a distributed environment, fabrication machine 822 may be located at a remote location and acquire data set information from data processing system 800 over network interface 824.

The methods and apparatuses described herein may also or alternatively be used in conjunction with other segmentation techniques, including but not limited to segmentation by sparse voxel representation, such as described in U.S. patent application Ser. No. 17/138,824, titled "Machine learning dental segmentation system and methods using sparse voxel representations," herein incorporate by reference in its entirety. Each segmentation technique may have its own strengths and weaknesses, and the use of multiple segmentation techniques, and particularly segmentation techniques that may operate on the same 3D data but based on different fundamental principles, as between the segmentation by graph-based representation of the 3D mesh and sparse voxel representation may be particularly helpful. This may be particularly helpful for determining the 'goodness' of a segmentation in an automated or semi-automated manner. It may be difficult to determine how accurately a particular segmentation technique is when segmenting different dentitions. The methods and apparatuses described herein may address this challenge by comparing the results of a second segmentation technique for the same 3D data with a graph-based representation of the 3D mesh segmentation technique. For example, the same dataset may be segmented by both graph-based representation of the 3D mesh as described herein and a second segmentation technique (e.g., sparse voxel representation) and the resulting segmentations may be compared over sub-regions of the 3D data. The results of the comparison may be thresholded (e.g., within +/−1%, 2%, 3%, 4%, 5%, 10%, 15%, 20%, 25%, etc.), indicating regions of high and low confidence for the segmentation. Regions of low correlation may be re-segmented or segmented using a third technique, and/or may be flagged for intervention by a technician.

Any of the methods and apparatuses described herein may also be used as part of a tracking and/o diagnostic technique. For example, the methods and apparatuses described herein may be used to detect how close an actual boundary or region (e.g., gingival line, marginal line, etc.). For example, the methods and apparatuses described herein may use graph-based representation of the 3D mesh to determine a gingival line from the patient's current dentition, e.g., using a digital scan of the patient's dentition, and may also use a target gingival line (or a historical gingival line). The segmentation as described herein may provide a realistic and accurate gingival line from a current (or prior) 3D model of the patient's dentition, and the same model may be used with a target or desired gingival line. The apparatus or method may take difference measurements between the two to determine how far from a target or reference gingival line the patient's current gingival line is, and/or to track a change in gingival position (e.g., recession) over time.

Similar techniques may be used for other dental features as well. For example, segmentation by graph-based representation of the 3D mesh may be used to monitor, track and/or grade a margin line, e.g., of a tooth crown. An actual margin line may be determined using graph-based representation of the 3D mesh to segment the patient's dentition and to determine the margin line; this margin line may be compared to a target or desired margin line that may be set as a ground truth for the graph-based representation of the 3D mesh.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Thus, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the patient matter may be practiced. As mentioned, other embodiments may be utilized and derived there from, such that structural and logical substitutions and changes may be made without departing from the scope of this disclosure. Such embodiments of the inventive patient matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of training a machine learning model to segment a 3D dental model, the method comprising:

receiving, in a computing device, a three-dimensional (3D) mesh of a patient's dentition;

extracting mesh features from the 3D mesh, wherein the mesh features include face adjacency matrices describing adjacent and non-adjacent faces with respect to the 3D mesh;

creating a graph-based representation of the 3D mesh with the extracted mesh features wherein the face adjacency matrices of the extracted mesh features are edges of the graph-based representation; and applying the mesh features and/or the graph-based representation to train a machine learning model of the computing device to recognize graph-based segmentation elements corresponding to segmentation of the patient's dentition.

2. The method of claim 1, wherein the mesh features further include mesh faces of the 3D mesh.

3. The method of claim 1, wherein creating the graph-based representation further comprises using mesh faces as nodes of the graph-based representation.

4. The method of claim 3, further comprising storing the graph-based representation in a memory of the computing device.

5. The method of claim 1, wherein the mesh features can be one or more of a face center position, a face normal vector, a local curvature, and a face area.

6. The method of claim 1, further comprising segmenting the graph-based representation into individual dental components with the machine learning model.

7. The method of claim 1, wherein the 3D mesh comprises a scan of the patient's dentition.

8. The method of claim 1, further comprising repeating the receiving, extracting, creating, and applying steps for a plurality of 3D meshes of patients' dentitions.

9. The method of claim 1, wherein the machine learning model is trained to construct a semantic segmentation network in which multiple objects of the same class are treated as a single entity.

10. The method of claim 1, wherein the machine learning model is trained to construct an instance segmentation network in which multiple objects of the same class are treated as distinct individual objects or instances.

11. A method of training a machine learning model to segment a 3D dental model, the method comprising:

receiving, in a computing device, a three-dimensional (3D) mesh of a patient's dentition;

creating, in the computing device, a graph-based representation of the 3D mesh that represents the patient's dentition;

receiving, in the computing device, a ground truth input comprising a manual segmentation of the 3D mesh, wherein the ground truth input identifies individual teeth, gingiva, and interproximal spaces; and training a machine learning model of the computing device to produce a segmentation output that attempts to achieve the ground truth input.

12. The method of claim 11, further comprising segmenting the graph-based representation into individual dental components with the trained machine learning model.

13. The method of claim 11, further comprising identifying interproximal spaces between teeth with the trained machine learning model.

14. The method of claim 11, further comprising identifying individual teeth with the trained machine learning model.

15. The method of claim 11, further comprising repeating the receiving, creating, receiving, and training steps for a plurality of 3D meshes of patients' dentitions.

16. The method of claim 11, wherein training the machine learning model comprises adjusting weights of the machine learning model to minimize an error between the ground truth input and the segmentation output.

17. A method of segmenting a 3D dental model, the method comprising:

receiving, in a computing device, a three-dimensional (3D) mesh of a patient's dentition;

creating a graph-based representation of the 3D mesh;

applying the graph-based representation to a trained machine learning model of the computing device to recognize segmentation elements corresponding to segmentation of the patient's dentition, wherein the graph-based representation includes mesh features with face adjacency matrices describing adjacent and non-adjacent faces with respect to the 3D mesh as edges of the graph-based representation; and outputting a segmented 3D model of the patient's dentition.

18. A method of training a machine learning model to segment a 3D dental model, the method comprising:

receiving, in a computing device, a three-dimensional (3D) mesh of a patient's dentition;

extracting mesh features from the 3D mesh, wherein the mesh features include face adjacency matrices describing adjacent and non-adjacent faces with respect to the 3D mesh;

coarsening the 3D mesh to reduce a size of the mesh;

creating a graph-based representation of the coarsened 3D mesh with the extracted mesh features using face adjacency matrices as edges of the graph-based representation; and applying the mesh features and/or the graph-based representation to train a machine learning model of the computing device to recognize graph-based segmentation elements corresponding to segmentation of the patient's dentition.

19. The method of claim 18, wherein coarsening the 3D mesh comprises:

computing a cosine similarity of the mesh features;

eliminating mesh features with a cosine similarity below a first threshold; and applying pooling to remaining mesh features.

20. The method of claim 19, wherein the pooling comprises Graclus pooling.

21. The method of claim 19, wherein the pooling is repeated until a number of remaining nodes in the 3D mesh is less than or equal to a second threshold.

22. The method of claim 19, wherein the first threshold comprises 0.995.

23. The method of claim 21, wherein the second threshold comprises 200,000.

* * * * *